United States Patent Office 3,573,300
Patented Mar. 30, 1971

3,573,300
ONIUM SALT ADDUCTS OF REACTIVE
HALO-TRIAZINES
Floyd J. Green, West Chester, Ohio, and Philip P. Goland, Chicago, Ill., assignors to Will Ross, Inc., Milwaukee, Wis.
No Drawing. Continuation-in-part of application Ser. No. 714,325, Mar. 19, 1968. This application Feb. 14, 1969, Ser. No. 799,514
Int. Cl. C07d 55/48
U.S. Cl. 260—248           5 Claims

ABSTRACT OF THE DISCLOSURE

Novel onium salt adducts are prepared by reacting a cyclic nitrogen compound containing one or more reactive halogen substituents (e.g., cyanuric chloride) with a cyclic compound containing a carbonyl or thione group conjugated with nitrogen or oxygen, e.g., 2(1-H)-pyridone. The resultant products possess desirable cross-linking and polymerizing properties.

---

This application is a continuation-in-part of our co-pending application S.N. 714,325, filed Mar. 19, 1968, now abandoned.

This invention relates to novel onium salt adducts of reactive halogen cyclic nitrogen compounds and to processes for preparing them. More specifically, the invention relates to onium salt adducts which result from the reaction between (1) a cyclic nitrogen compound containing one or more reactive halogen atoms as substituents on the ring, with (2) a cyclic compound containing a carbonyl or thione group conjugated with a hetero atom (nitrogen or oxygen).

These compounds can be tailored to have diverse physical properties dependent upon the nature of the reactants. Many compounds of the invention have the advantage of being water-soluble even though the intermediates from which they are prepared may be water-insoluble. As water-soluble materials, they possess desirable biostatic, biocidal, crosslinking and polymerizing properties.

The compounds of the invention have the generic formulas:

$$R_1 - \overset{A^{\ominus}}{\underset{\oplus}{W}} \diagup_Y^Z \diagdown C-X-Q \quad (I)$$

$$R_1 - \overset{A^{\ominus}}{\underset{\oplus}{W}} - W - C \diagup_Y^Z \diagdown C-X-Q \quad (II)$$
$$\phantom{R_1 -}\underset{R_2}{|}$$

In the above formulas:

W is nitrogen or oxygen in Formula I and nitrogen in Formula II.

Y and Z are carbon chains.

$R_1$ and $R_2$ are the same or different hydrocarbon radicals, e.g., alkyl, alkenyl, aryl, aralkyl or heterocyclic groups, or hydrogen, as discussed below.

A is a halogen, preferably chlorine, bromine, or fluorine.

X is oxygen or sulfur.

Q is the nucleus of a reactive halogen cyclic nitrogen compound containing

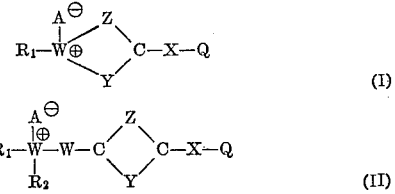

Y and Z are conjugated or non-conjugated carbon chains. When Y is non-conjugated, one or more hetero atoms, i.e., nitrogen, oxygen, sulfur, etc., can be substituted in chain Y for the corresponding number of carbon atoms. When both Y and Z are non-conjugated, the number of atoms in chain Y must be qual to 0 (i.e., Y is absent) and Z is any positive integer for the structure shown in Formula I. When chain Y is present in the structure, and is non-conjugated, chain Z must be conjugated; however, one or more nitrogen atoms can serve in chain Z instead of the corresponding carbon atoms. When substituted for carbon atoms in this manner, the nitrogen atoms become integral parts of a vinylogous system. In general, the structures of Y and Z must be such that at least one chain of conjugated carbon (or nitrogen) atoms exists between atom X and hetero atom W.

When the hetero atom W is nitrogen, one of the ligands $R_1$ or $R_2$ can be hydrogen. The number of ligands required is dependent on the valence requirements of the specific hetero atom in its onium salt form, i.e., four for nitrogen

and three for oxygen

The novel compounds of the invention are prepared through the reaction of a suitable carbonyl or thiocarbonyl compound with a reactive halogen cyclic nitrogen compound in accordance with the following equations:

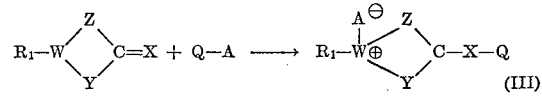

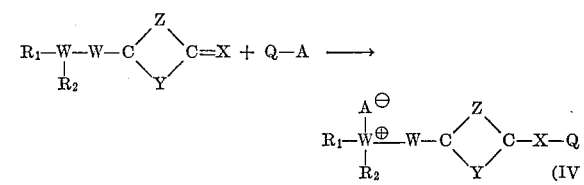

Where Q—A is a reactive halogen cyclic nitrogen compound; its nucleus is Q and A represents one or more replaceable halogen atoms, preferably chlorine, bromine or fluorine. The nucleus Q contains 3

groups. The other substituents have the significance previously described in connection with Formulas I and II.

The hetero atom W in these reactions serves a dual function:

(1) It activates the carbonyl or thiocarbonyl group to react atypically as nucleophile through the carbonyl or thiocarbonyl oxygen or sulfur;

(2) It becomes a cation and thus an anion acceptor following the vinylogous rearrangement which results from the nucleophilic attack on the cyclic compound Q—A. The leaving halogen nucleophile (A) simultaneously seeks the cationic site to serve as the anionic portion of the onium compound.

The reactive halogen cyclic nitrogen compounds (Q—A) which can be used according to the invention are the symmetrical trihalo triazines, such as cyanuric chloride, cyanuric bromide, cyanuric fluoride, difluorochloro-s-triazine, fluorodichloro-s-triazine, and cyanuric iodide.

It should be understood that in the representation Q—A, the group A may represent more than one reactive halogen atom substituted on the cyclic nitrogen-containing nucleus. Each of the reactive halogen atoms may in turn react with the carbonyl or thiocarbonyl compound described above to produce one of the novel compounds of the invention. Thus, for example, cyanuric chloride, which contains three reactive chlorine atoms, readily reacts with 1 or 2 moles of carbonyl or thiocarbonyl compound to form an unsymmetrical or symmetrical product containing 1 or 2 ether or thioether linkages. The reaction of the remaining chlorine atom is identical to the substitution reaction of the third chlorine atom of cyanuric chloride.

The ether or thioether linkages which are present in the compounds of the present invention are usually susceptible to cleavage in some instances merely by alkaline hydrolysis, thus creating 1 or more sites on Q which are again readily available for nucleophilic attack. The functionality (i.e., cross-linkability) of a reaction product of the invention is similar to the functionality of the reactive halogen compound from which it is made. This can be shown for the adduct of 1-methyl-2-pyrrolidinone and cyanuric chloride: by reacting aziridine (ethylenimine) with this adduct, a product identical to the reaction product of cyanuric chloride and aziridine (ethylenimine) is formed, as shown in Example 15.

The preparation of the compounds of the invention is illustrated in the following examples.

EXAMPLE 1

2,2'-[(6-chloro-s-triazine-2,4-diyl)dioxyl]-bis[(1H)-1-pyridinium chloride]

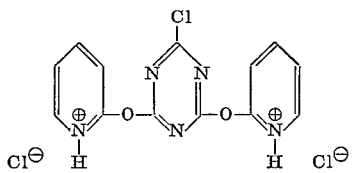

95 grams of 2(1H)-pyridone was dissolved in 700 ml. of dichloromethane (Solution 1). 92 grams of cyanuric chloride was dissolved in 800 ml. of dichloromethane to form Solution 2. Solution 1 was added to Solution 2 with agitation at room temperature. Instantaneously, the mixture developed a red-brown color. After 30 minutes crystals began to form and heat was applied until the solution started to reflux (pot temperature 42° C.). Reflux was continued for 4 hours and the solution was cooled to 10° C. while being protected from moisture. The tan crystalline mass which formed was filtered, washed with 200 ml. of dichloromethane, and dried in a vacuum oven at ambient temperature. It had a melting point of 142–144° C. The structure was elucidated by means of elemental analysis, IR and NMR spectroscopy and potentiometric titration. The product was extremely soluble in water. A 1.5% aqueous solution had a pH of 1.25.

*Analysis.*—Calcd. (percent): C, 41.68; H, 2.69; O, 8.54; N, 18.69; Cl, 28.40. Found (percent): C, 43.01; H, 2.92; O, 9.00; N, 17.64; Cl, 27.37.

The same method described above was used in preparing the compounds described in the examples below except as otherwise noted. Symmetrical compounds involving the use of cyanuric chloride were formed by reacting two moles of the carbonyl reactant to one mole of cyanuric chloride, while the asymmetrical compounds were obtained using a 1:1 ratio of these reactants.

EXAMPLE 2

2 moles of N-methyl-2-pyrrolidinone were reacted with 1 mole of cyanuric chloride to form 2,2'-[(6-chloro-s-triazin-2,4-diyl)dioxy]-bis[1 - methyl - 1 - pyrrolinium chloride].

184.46 g. of cyanuric chloride was dissolved in 600 ml. of N-methyl-2-pyrrolidinone at 25° C. and the temperature was maintained at 20–25° C. for 24 hrs. The precipitate was filtered off and washed with 100 ml. of cold dioxane followed by an equal portion of cold ethyl ether. After being dried in a vacuum desiccator, the product melted at 169–170° C. The product, 2,2'-[(6-chloro - s - triazin - 2,4 - diyl)-dioxy]-bis[1-methyl-1-pyrrolinium chloride], had the structure:

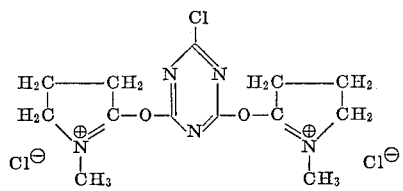

*Analysis.*—Calcd. (percent): C, 40.80; H, 4.74; O, 8.36; N, 18.31; Cl, 27.70. Found (percent): C, 39.95; H, 4.69; O, 9.05; N, 18.50; Cl, 26.99.

EXAMPLE 3

2 moles of N-methyl-2-piperidone were reacted with 1 mole of cyanuric chloride to form 2,2'-[(6-chloro-s-triazin-2,4-diyl)dioxy]-bis[1 - methyl - 1 - piperidinium chloride].

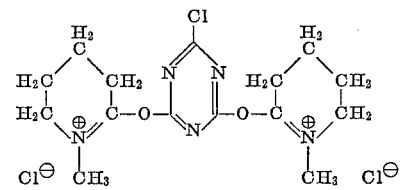

*Analysis.*—Calcd. (percent): C, 43.86; H, 5.39; O, 7.79; N, 17.06; Cl, 25.80. Found (percent): C, 42.71; H, 5.70; O, 8.50; N, 17.50; Cl, 25.48.

EXAMPLE 4

2 moles of N-methyl-2-pyridone were reacted with 1 mole of cyanuric chloride to form 2,2'-[(6-chloro-s-triazin-2,4-diyl)dioxy]-bis[1-methylpyridinum chloride].

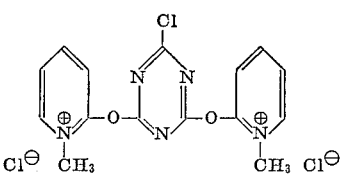

*Analysis.*—Calcd. (percent): C, 44.74; H, 3.48; O, 7.95; N, 17.39; Cl, 26.44. Found (percent): C, 44.94; H, 3.97; O, 8.20; N, 16.79; Cl, 21.15.

EXAMPLE 5

2,2'-[(6-chloro-s-triazin - 2,4 - diyl)dioxy]-bis-pyridine was prepared by neutralizing the compound of Example 1 with NH₃ in anhydrous methanol at 0° C.

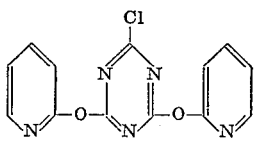

EXAMPLE 6

2,2'-[(6 - chloro - s - triazin-2,4-diyl)dioxy]bis[(1H)-1-pyridinium fluoride] was prepared by bubbling hydrogen fluoride into a finely divided suspension of the product of Example 5 in dichloromethane at 0° C. Two equivalents of HF were utilized and there was an appropriate increase in weight of the product as required by a compound of the following structure:

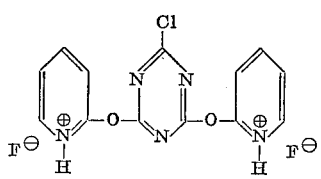

EXAMPLE 7

1 mole of 9-diethylaminobenzo [α] phenoxazin-5-one was reacted with 1 mole of cyanuric chloride to form 5[(2,4-chloro-s-triazin-6-yl)oxy] - 9 - diethylaminobenzo[α]phenoxazonium chloride.

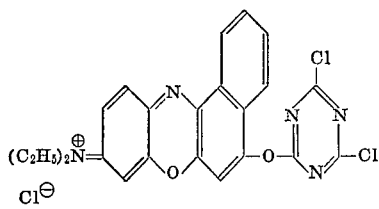

*Analysis.*—Calcd. (percent): C, 54.94; H, 3.60; O, 6.37; N, 13.93; Cl, 21.15. Found (percent): C, 55.46; H, 3.25; O, 6.89; N, 13.00; Cl, 17.20.

EXAMPLE 8

2 moles of (1H)-2-pyrrolidinone were reacted with 1 mole cyanuric chloride to form 2,2'-[(6-chloro-s-triazine-2,4-diyl)dioxyl]-bis[(1H)-1-pyrrolinium chloride].

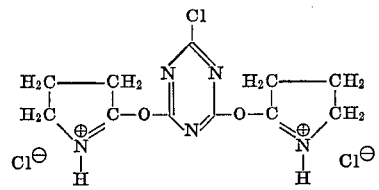

*Analysis.*—Calcd. (percent): C, 37.25; H, 3.95; O, 9.03; N, 19.75; Cl. 30.01. Found (percent): C, 36.95; H, 3.78; O, 10.33; N, 19.05; Cl, 29.85.

EXAMPLE 9

2,2'-[(6-chloro-s-triazine - 2,4 - diyl)dioxy]-bis[5-methyl-1-furanium chloride]

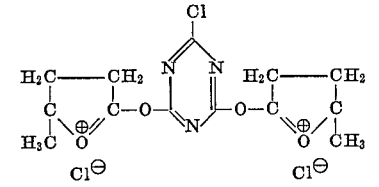

18.4 g. (0.1 mole) of cyanuric chloride was treated with 60 g. (0.6 mole) of γ-valerolactone at 100° C. for 12 hours under dry conditions. The reaction mixture was cooled and the wall of the flask scratched with a stirring rod to induce crystallization. Then 4 volumes of dichloromethane were added and the mixture allowed to stand 6 hours, protected from moisture, and the crystals filtered off and dried in a vacuum desiccator.

*Analysis.*—Calcd. (percent): C, 40.80; H, 3.69; O, 16.74; N, 10.98; Cl, 27.79. Found (percent): C, 39.98; H, 3.73; O, 16.84; N, 9.90; Cl, 27.40.

EXAMPLE 10

2,2'[(6-chloro-s-triazine - 2,4 - diyl)dithio]bis[(1H)-1-pyridinium chloride]

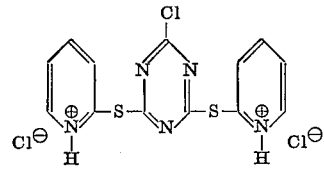

2 moles of (1H)-2-pyridinethione were reacted with 1 mole of cyanuric chloride.

*Analysis.*—Calcd. (percent): C, 38.38; H, 2.48; S, 15.76; N, 17.21; Cl, 26.15. Found (percent): C, 37.98; H, 2.56; S, 15.05; N, 16.95; Cl, 25.90.

EXAMPLE 11

2,2'[(6-chloro-s-triazine-2,4-diyl)dioxy]bis[1-vinylpyrrolinium chloride]

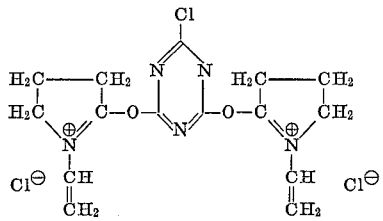

The same method utilized for Example 2 was used. 18.4 g. (0.1 mole) of cyanuric chloride was reacted with 60 g. (0.54 mole) of 1-vinyl-2-pyrrolidinone. The reaction was extremely exothermic and the temperature rose to 25–30° C. much more rapidly (in approximately 5–10 minutes) than it did when Example 2 was prepared. Addition of 4 volumes of dichloromethane, at this point, moderated the reaction.

*Analysis.*—Calcd. (percent): C, 44.30; H, 4.47; O, 7.87; N, 17.21; Cl, 26.15. Found (percent): C, 43.99; H, 4.52; O, 8.00; N, 16.55; Cl, 25.92.

EXAMPLE 12

2[4,6-dichloropyrimidine-2-yl)oxy]-1-methyl-1-pyrrolinium chloride

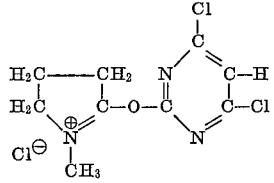

Under dry box conditions, 106.35 g. (1 mole) of 2,4,6-trichloropyrimidine was reacted with 99.3 g. (1 mole) of 1-methyl-2-pyrrolidinone at 30° C. After 90 minutes, the reaction was quenched with 4 volumes of dichloromethane and the mixture was cooled to 10° C. and maintained at this temperature for 4 hours. The resulting solid was filtered off and dried in a vacuum desiccator.

EXAMPLE 13

2,2,4,4,6,6,8,8 - Octahydro - 2,2,4,4,6,6,8,8 - octakis(2-pyridyloxy) - 1,3,5,7,2,4,6,8 - tetrazatetraphosphocine octahydrochloride

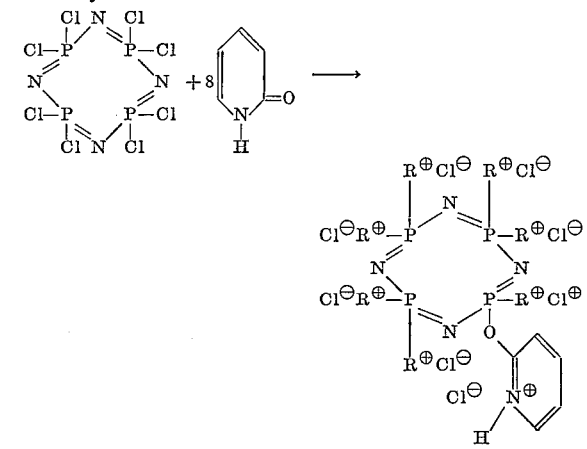

where

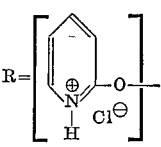

Adduct is formed by refluxing 8 moles of 2(1H)-pyridone with 1 mole of phosphonitrile chloride tetramer in a 1,2-dichloroethane solution. Compounds with differing degrees of addition are obtained by varying the mole ratio of 2(1H)-pyridone to phosphonitrilic tetramer.

Typical of other compounds which can be reacted with the reactive halogen cyclic nitrogen-containing nucleus (Q) to form a product of the invention are the following:

1-benzyl-2-pyrrolidinone
3-o-ethylphenyl-2-methyl-4(3H)-quinazolinone
4-hydroxy-1-methyl-2(1H)-quinolone
γ-thiobutyrolactone
N-methylbenzothiazole-2-thione
p-dimethylaminobenzaldehyde
ε-thiocaprolactam

EXAMPLE 14

15 g. of 2,2'-[(6-chloro-s-triazin-2,4-diyl)dioxy]-bis-[1-methyl-1-pyrrolinium chloride] was dissolved in 1 liter of distilled water. The solution was placed in a cooling bath at 10° C. While the temperature is maintained at 10° C., 4.5 gm. of aziridine (ethylenimine) was added with stirring. This was followed by the addition of 6 g. of sodium carbonate, resulting in the formation of a precipitate. The precipitate was filtered off and dried; the crude product had a melting point of 128–130° C. Following recrystallization from benzene, the product melted at 134–135° C. The product of a direct reaction between cyanuric chloride and aziridine also melted at 134–135° C. and the IR spectra of these products were identical. The yield was only about 20% of theory due to a competitive hydrolytic reaction.

The compounds of the invention are suitable for various uses because of their biostatic, biocidal, crosslinking, and polymerizing activity. The compounds show marked biostatic and biocidal activity against lower forms of life such as bacteria, viruses, fungi, molds, and algae when contacted in aqueous solutions at high dilution. For example, a 1% solution of 2,2'-[(6-chloro-s-triazin-2,4-diyl)-dioxy]-bis[1-methyl-1-pyrrolinium chloride] was found to have a strong bacteriocidal action against *Staphylococcus aureus*, *E. coli*, and *B. subtilis*. This biocidal activity is manifested over a very wide range of pH, including acid, neutral, and alkaline conditions.

While the compounds of the invention show various forms of biostatic and biocidal activity per se over a wide range of pH, they are also active as biostats and biocides through a crosslinking action. Thus, they exert a biocidal action during penertation into various matrix materials harboring destructive or otherwise deleterious agents. After adequate penetration on the addition of alkali, as in washing or soaping-off processes, the compounds of the invention can produce a biocidal effect through a crosslinking of vital enzyme systems of the noxious organisms. Moreover, by a crosslinking action, they can render a matrix material resistant to various types of physical, chemical, or enzymatic attack. By treatment in this manner, the crosslinked organic macromolecular latices are rendered suitable for supporting the growth of destructive agents such as by specific bacterial molds, viruses, fungi and the like. In addition to serving as crosslinking agents, onium fluoride salt adducts can exert specific effects due to the fluoride ion.

The foregoing detailed description has been given for clearness of understanding only, and no unnecessary limitations should be understood therefrom, as modifications will be obvious to those skilled in the art.

What is claimed is:

1. An onium salt having any of the structural formulas:

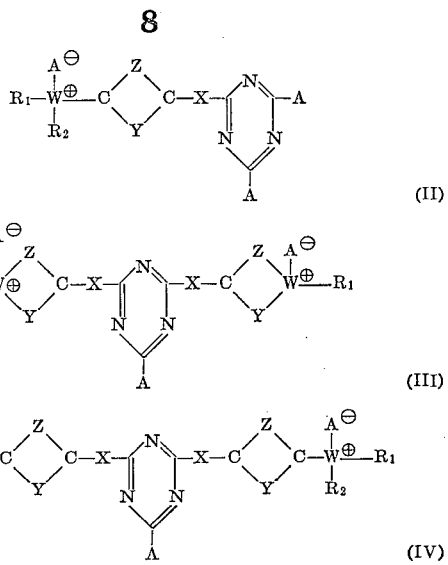

where

W is nitrogen or oxygen in Formulas I and III and nitrogen in Formulas II and IV;
Y and Z are chains of zero to 8 carbon atoms, at least one of which is conjugated;
$R_1$ and $R_2$ are the same or different lower alkyl or lower alkenyl groups;
A is a halogen; and
X is oxygen or sulfur.

2. The compound of claim 1 where $R_1$ and $R_2$ are lower alkyl groups, X is oxygen, A is chlorine, and W is nitrogen.

3. 2,2'[(6-chloro-s-triazin-2,4-diyl)-dioxyl] - bis (1H)-1-pyridinium chloride.

4. The method of producing an onium salt adduct of halogenated cyclic nitrogen compound which comprises reacting a conjugated cyclic carbonyl or thio-carbonyl compound with a halogenated cyclic nitrogen compound in accordance with any of the equations:

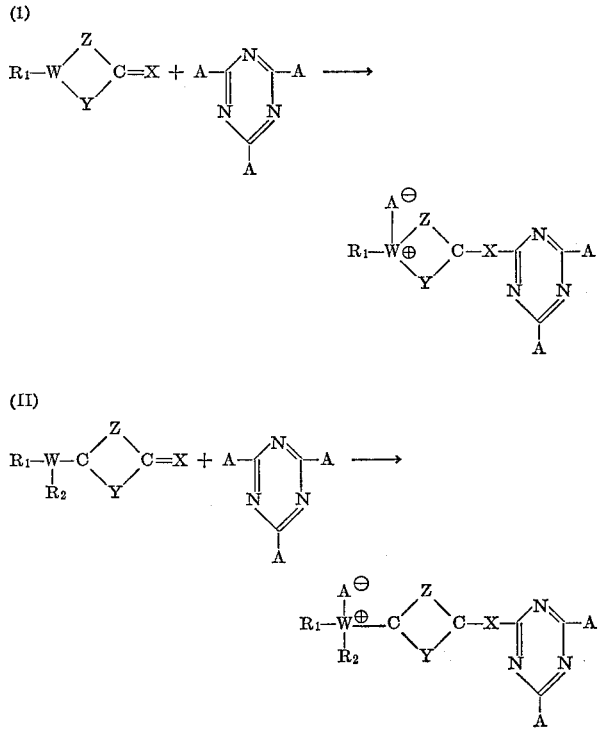

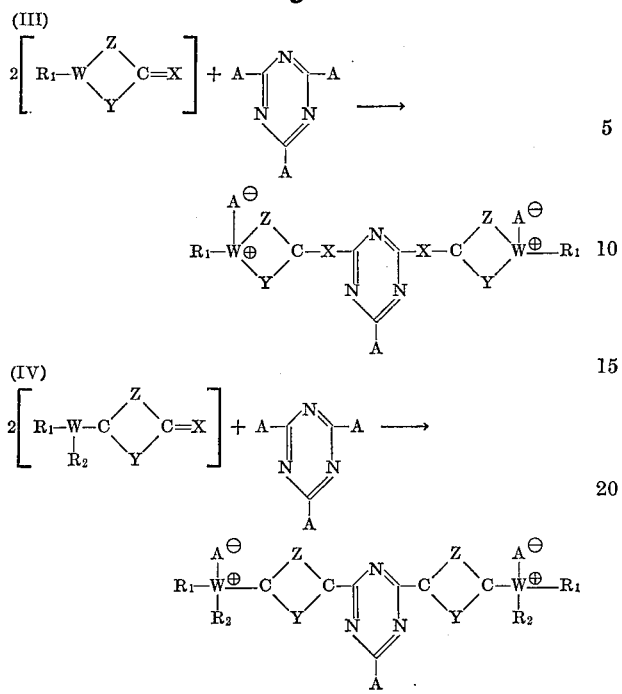

where

A is a halogen atom:

W is nitrogen or oxygen in Equations I and III and nitrogen in Equations II and IV;

Y and Z are chains of zero to 8 carbon atoms, at least one of which is conjugated;

$R_1$ and $R_2$ are the same or different lower alkyl or lower alkenyl groups, or hydrogen; and X is oxygen or sulfur.

5. The method of claim 4 wherein A is chlorine, W is nitrogen, X is oxygen, and $R_1$ and $R_2$ are lower alkyl groups.

References Cited
UNITED STATES PATENTS

| | | | |
|---|---|---|---|
| 3,245,992 | 4/1966 | Dexter et al. | 260—248 |
| 3,454,551 | 7/1969 | Mangini et al. | 260—248X |

JOHN M. FORD, Primary Examiner

U.S. Cl. X.R.

260—296, 999

PO-1050
(5/69)

UNITED STATES PATENT OFFICE
CERTIFICATE OF CORRECTION

Patent No. 3,573,300            Dated March 30, 1971

Inventor(s) Floyd J. Green and Philip P. Goland

It is certified that error appears in the above-identified patent and that said Letters Patent are hereby corrected as shown below:

Col. 1, formula beginning on line 67 should be $$-3 -\overset{A}{C} = N- \text{ groups}$$

Col. 2, line 32 (in formula IV), delete second occurrence of W.

Col. 2, line 37 (in formula IV), delete second occurrence of W.

Col. 5, line 23, "dioxyl" should be --dioxy--.

Col. 7, line 48, "penertation" should be --penetration--

Col. 7, line 57, "suitable" should be --unsuitable--

Col. 8, Claim 3, line 1, "dioxyl" should be --dioxy--

Signed and sealed this 17th day of October 1972.

(SEAL)
Attest:

EDWARD M. FLETCHER, JR.            ROBERT GOTTSCHALK
Attesting Officer                  Commissioner of Patents